US011960976B2

(12) United States Patent
Ghibril et al.

(10) Patent No.: US 11,960,976 B2
(45) Date of Patent: Apr. 16, 2024

(54) DECOMPOSING TASKS THROUGH ARTIFICIAL INTELLIGENCE CHAINING

(71) Applicant: B.yond, Inc., Frisco, TX (US)

(72) Inventors: Johnny Ghibril, Brookline, MA (US); Baris Abaci, Instanbul (TR)

(73) Assignee: B.YOND, INC., Redmond, WA (US)

( * ) Notice: Subject to any disclaimer, the term of this patent is extended or adjusted under 35 U.S.C. 154(b) by 1313 days.

(21) Appl. No.: 16/121,494

(22) Filed: Sep. 4, 2018

(65) Prior Publication Data

US 2019/0164087 A1  May 30, 2019

Related U.S. Application Data

(60) Provisional application No. 62/592,902, filed on Nov. 30, 2017.

(51) Int. Cl.
*G06N 20/00* (2019.01)
*G06N 5/02* (2023.01)
*G06N 5/04* (2023.01)

(52) U.S. Cl.
CPC ............. *G06N 20/00* (2019.01); *G06N 5/02* (2013.01); *G06N 5/04* (2013.01)

(58) Field of Classification Search
None
See application file for complete search history.

(56) References Cited

U.S. PATENT DOCUMENTS

| 2003/0217129 | A1 | 11/2003 | Knittel et al. |
| 2007/0282988 | A1 | 12/2007 | Bornhoevd et al. |
| 2015/0317589 | A1 | 11/2015 | Anderson et al. |
| 2017/0213156 | A1 | 7/2017 | Hammond et al. |
| 2017/0322579 | A1 | 11/2017 | Goparaju et al. |

OTHER PUBLICATIONS

Buijs, Flexible Evolutionary Algorithms for Mining Structured Process Models, Technische Universiteit Eindhoven, 2014, pp. 1-391 (Year: 2014).*
Salem, Leveraging Resources on Anonymous Mobile Edge Nodes, Doctoral Thesis, Computer Science, Old Dominion University, 2018, pp. 1-140 (Year: 2018).*
García, The Evolution of the Cloud: The Work, Progress and Outlook of Cloud Infrastructure, Masters Thesis, Massachusetts Institute of Technology, 2015, pp. 1-62 (Year: 2015).*

(Continued)

*Primary Examiner* — Wilbert L Starks
(74) *Attorney, Agent, or Firm* — WTA Patents

(57) ABSTRACT

Embodiments relate to intelligent entities for providing information service over a network in a telecommunication system. An intelligent element framework manages intelligent entities, which are modular and trained using artificial intelligence or machine learning algorithms to perform prediction or inference for different types of applications. The intelligent entities may communicate with each other via the intelligent element framework. For example, an intelligent entity may generate an output and provide the output for use by one or more other intelligent entities. Thus, the intelligent element framework may distribute portions of tasks for information service across multiple intelligent entities chained together, for example, in a directed graph configuration.

20 Claims, 10 Drawing Sheets

(56) References Cited

OTHER PUBLICATIONS

De Coninck, E. et al., "DIANNE: Distributed Artificial Neural Networks for the Internet of Things," Proceedings of the $2^{nd}$ Workshop on Middleware for Context-Aware Applications in the IOT, Dec. 2015, pp. 19-24.

European Patent Office, Extended European Search Report and Opinion, EP Patent Application No. 18884826.1, dated Jul. 30, 2021, ten pages.

Leroux, S. et al., "The cascading neural network: building the Internet of Smart Things," Knowledge and Information Systems, vol. 52, No. 3, Feb. 16, 2017, pp. 791-814.

Teerapittayanon, S. et al., "Distributed Deep Neural Networks over the Cloud, the Edge and End Devices," 2017 IEEE $37^{th}$ International Conference on Distributed Computing Systems, Jun. 5, 2017, pp. 328-339.

PCT International Search Report and Written Opinion, PCT Application No. PCT/US2018/059506, dated Feb. 21, 2019, 12 pages.

Communication pursuant to Article 94(3) EPC of EP Application No. of 18 884 826.1 dated Nov. 22, 2023.

\* cited by examiner

900

```
┌─────────────────────────────────────────────────────┐
│ Deploy management components associated with        │
│ intelligent entities to perform prediction or       │
│ inference                                           │
│ 910                                                 │
└─────────────────────────────────────────────────────┘
                          │
                          ▼
┌─────────────────────────────────────────────────────┐
│ Perform prediction or inference to generate a first │
│ output by a first intelligent entity                │
│ 920                                                 │
└─────────────────────────────────────────────────────┘
                          │
                          ▼
┌─────────────────────────────────────────────────────┐
│ Receive the first output from the first intelligent │
│ entity by a second intelligent entity via an        │
│ intelligent element framework                       │
│ 930                                                 │
└─────────────────────────────────────────────────────┘
                          │
                          ▼
┌─────────────────────────────────────────────────────┐
│ Perform, by the second intelligent entity,          │
│ prediction or inference to generate a second output │
│ based at least on the first output                  │
│ 940                                                 │
└─────────────────────────────────────────────────────┘
                          │
                          ▼
┌─────────────────────────────────────────────────────┐
│ Send the second output to one or more target        │
│ systems to provide information service              │
│ 950                                                 │
└─────────────────────────────────────────────────────┘
```

DECOMPOSING TASKS THROUGH ARTIFICIAL INTELLIGENCE CHAINING

CROSS-REFERENCE TO RELATED APPLICATION

This application claims priority under 35 U.S.C. § 119(e) to U.S. Provisional Patent Application Ser. No. 62/592,902 filed on Nov. 30, 2017, which is incorporated by reference herein in its entirety.

BACKGROUND

This disclosure relates generally to operations of large scale networks of computing devices for cloud computing, and specifically relates to providing information services through chaining a plurality of artificial intelligence entities in telecommunication infrastructure.

Cloud computing have enabled information services to be dissociated from specific computing devices and physical hardware. For example, a service for a client device may be assigned to a given server of a large data center, and the server may execute multiple services. These large data centers are referred to as the "cloud," and cloud resources are provided by cloud service providers.

Operations of networks may be performed more efficiently using automation by computing devices than manually by technicians. The amount of data generated may be overwhelming to be reviewed and analyzed by manual operation. Large-scale data enables statistical analysis and model training. Though, a given machine learning algorithm or monolithic artificially intelligent entity may be stronger at performing certain tasks than others, which may result inconsistent performance across different functionalities. It is challenging to effectively distribute tasks of an information service for automation by among computing devices in a network.

SUMMARY

Embodiments relate to using intelligent entities to provide information service in a network of computing devices. In an embodiment, management components are deployed in an information service infrastructure to perform a task of an information service associated with performance of the information service. Each of the management components are associated with an intelligent entity configured to perform, using an automation algorithm, prediction or inference associated with a portion of the task handled by the management component. Prediction or inference is performed to generate a first output by a first intelligent entity. The first output is received by a second intelligent entity from the first intelligent entity via an intelligent element framework. The second intelligent entity performs prediction or inference to generate a second output based at least on the first output. The second output is sent to one or more target systems to provide the information service.

BRIEF DESCRIPTION OF THE DRAWINGS

FIG. 9 is a flow chart illustrating a process for providing information service using intelligent entities, according to one embodiment.

Figure 1:
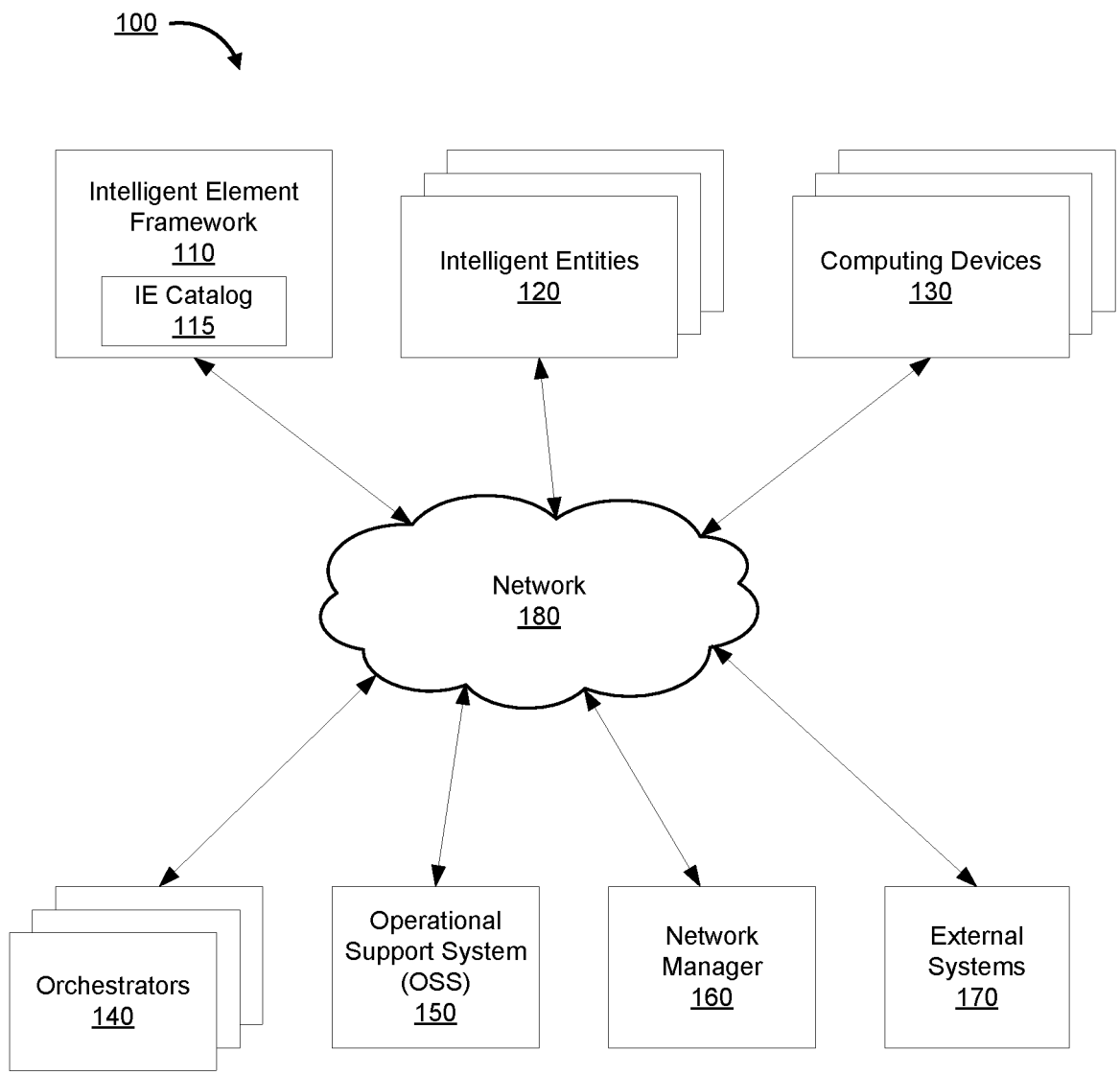
FIG. 1 is a diagram of a telecommunication system for providing information services, according to one embodiment.

The figures depict embodiments of the present disclosure for purposes of illustration only.

DETAILED DESCRIPTION

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, like reference numerals in the drawings denote like elements.

Embodiments relate to providing information service using intelligent entities managed by an intelligent element framework. In contrast to systems using a monolithic artificial intelligence block, the intelligent element framework configures multiple intelligent entities (e.g., related to each other in a chain or directed graph) to distribute portions of tasks to be executed using artificial intelligence or machine learning algorithms. The modular approach performed by the intelligent element framework may enable execution of complex tasks, scaling, reutilization, and automation by intelligent entities in a flexible architecture.

The information service described herein refers to a service that includes at least one of providing, collecting, or processing data or information to or from or between users and devices using telecommunication infrastructure. Example information services include, among others, Internet broadcasting services, social networking services, messaging services, web hosting services, augmented reality (AR) processing, gaming, virtual reality (VR) programming, video messaging, video surveillance, remote monitoring, drone control, smart city applications, navigation, connected vehicle applications, fleet management, asset tracking, assisted driving, automated driving support, precision agriculture, robot control, factory automation, health monitoring, activity tracking, recommendations, among others.

The intelligent element framework described herein refers to a platform embodied using one or more computing devices or networking devices to chain operations of intelligent entities. The intelligent element framework include hardware, software, firmware or a combination thereof.

Overview of Example System

Figure (FIG. 1 is a diagram of a telecommunication system 100 for providing information services, according to one embodiment. The system 100 includes an intelligent element framework 110, intelligent entities 120, one or more computing devices 130, one or more orchestrators 140, an operational support system (OSS) 150, network manager 160, and one or more external systems 170, connected to each other via a network 180. In other embodiments, different and/or additional components can be included in the system 100.

An intelligent entity 120 (also referred to herein as "IE") is software, hardware, firmware or a combination thereof that performs tasks using automation functions such as artificial intelligence or machine learning algorithms, e.g., supervised learning, unsupervised learning, or reinforcement learning mechanisms. In some embodiments, an intelligent entity 120 is trained to perform a specific sets of tasks or portions of tasks, e.g., predication or inference, resource management, network control, communication, policy, etc. For example, different intelligent entities 120 are trained using different sets of features. Accordingly, intelligent entities 120 may be customized for different applications of information services. Intelligent entities 120 may generate an output that is sent to another intelligent entity 120 or a target system for an information service. Intelligent entities 120 may exchange data elements having a value, timestamp, and metadata (e.g., to identify a source or destination of a data element). In addition, intelligent entities 120 may discover capabilities of other intelligent entities 120.

The intelligent element framework 110 facilitates communication between intelligent entities 120 and other components of the system 100. The intelligent element framework 110 may include an IE catalog 115 (e.g., IE registry) of information describing intelligent entities 120 available in the system 100. Upon instantiation, an intelligent entity 120 may contact the IE catalog 115, locate any required sources of input, or advertise to other IEs that the intelligent entity 120 is available for use. The IE catalog 115 may, for example, use a publish-and-subscribe mechanism to register instantiated IEs and notify instantiated IEs to other IDs. The intelligent element framework 110 transmits information between intelligent entities 120 according to a chaining configuration, which is further described below with reference to FIGS. 2-3 and 6. The intelligent element framework 110 may perform a complex operation (e.g., requiring artificial intelligence) by decomposing the complex operation into discrete tasks for execution by multiple intelligent entities 120. In other words, the intelligent element framework 110 may chain intelligent entities 120 together to perform tasks for information services.

Furthermore, the intelligent element framework 110 may determine a specific intelligent entity 120 that is suitable to perform a certain type of artificial intelligence task or parallelize execution of tasks among intelligent entities 120. As an example use case, an intelligent element framework 110 for an autonomous vehicle may manage a first intelligent entity 120 for predicting motion of other vehicles, a second intelligent entity 120 for tracking position of pedestrians, a third intelligent entity 120 for controlling speed of the autonomous vehicle, and a fourth intelligent entity 120 for navigation. These applications may require different types of machine learning algorithms or feature training, for instance, predicting motion of vehicles uses a physics-based model, tracking pedestrians uses image processing techniques, and navigation uses mapping algorithms.

In some embodiments, the intelligent element framework 110 (or an external component) may analyze existing chains of intelligent entities 120 to determine recommendations to improve their performance. The recommendation may indicate a reordering of IEs or functions in a directed graph, refining the data or output generated by a given intelligent entity 120, modifying (e.g., reducing or augmenting) the number or types of intelligent entities 120 assigned to a specific task, among other types of modifications.

Computing devices 130 of the system 100 provide information services to other computing devices by deploying and executing service components or tasks. Computing devices 130 may include one or more of a cloud server, telecommunication server, client device, gateway, edge device, or other types of telecommunication devices. In some embodiments, the computing devices 130 are structured in a hierarchical architecture including one or more levels. For example, a first level includes a cloud server, a second level includes an edge device, and a third level includes a client device. Computing devices 130 may communicate with other computing devices 130 in an adjacent level or non-adjacent level.

A service component of an information service refers to a discrete functional software or hardware component in a computing device that operate in conjunction with at least one other service component to provide the information service. Further, service components may be customized to a given type of information services. As examples, different service components may provide different functionalities including load balancing, data anonymization, data aggregation, data transformation (e.g., reformatting or conversions), alarming, threshold detection, pattern recognition (e.g., speech, video, image, etc.), remote control, encryption, authentication, authorization, rating, accounting, billing, routing, enrichment, trending, prediction, reporting, home automation, among others.

Cloud servers and telecommunication servers are types of computing devices 130 that provision and deploy service components of information services. A cloud service provider owns and operates a cloud server, while a telecommunication service provider owns and operates a telecommunication server. A telecommunication server may be distinguished from other servers in that it can serve as the gateway to a walled domain of a network manager 160. Thus, the telecommunication server may also include security and firewall rules, a portal for external access, accounting procedures, and monitoring to ensure high availability.

In some embodiments, cloud servers and telecommunication servers provision and deploy service components using one or more orchestrators 140, which may include a hierarchical orchestrator and local orchestrators (e.g., for a given level of a hierarchal architecture). An orchestrator may be embodied on a computing device 130 executing, for example, VMWARE® and OPENSTACK®. An orchestrator 140 may communicate with the other orchestrators 140 to track resources and allocate service components over the system 100.

A client device, also known as user equipment (UE) or customer premise equipment (CPE), is a type of computing device 130 that is operated by a user and can communicate data via the network 180. The client device is typically installed in a user's premise or carried by the user. The client device may provide information services or present information via a graphical user interface on a display of the client device, in some embodiments. Example client devices include conventional computer systems such as a desktop or laptop computer, a mobile telephone, a smartphone, tablet, or wearable device, among others.

A gateway is a type of computing device 130 that connects client devices to other computing devices 130 of the system 100 and facilitates interoperability between various computing devices 130. Similar to a client device, a gateway is typically installed on the user's premises or carried by the user, and enable the client devices to communicate over the network 180. Further, the gateway may connect multiple networks having different network protocols by performing protocol conversions. In some embodiments, the gateway serves as a proxy server or a firewall server in the network 180. Example gateways includes, for example, interne of things (IOT) gateways, BLUETOOTH® gateways, onboard communication devices, personal gateways, wireless access points, among others.

An edge device is a type of computing device 130 having resources to host at least one service component of an information service and also function as an access point to a network for providing the information service. The resources in the edge device can be either hardware or software that are configurable based on a command received from an external source (e.g., an orchestrator 140). Example edge devices may include micro data centers, edge routers, provider edge routers, aggregation routers, customer premise equipment (CPE), set-top boxes, cloudlets, fog nodes, wireless access points, wireless base stations, Long Term Evolution (LTE) protocol nodes such as an Evolved Node B, cable modems, DSL modems, optical termination points, reconfigurable optical add-drop multiplexer (ROADM), road side units, onboard computers, connected vehicles, satellite receivers, ground stations, digital subscriber line access multiplexer (DSLAM), switches, cable modem termination system (CMTS), broadband gateways, among others.

In some embodiments, an edge device is different from other servers or computing devices 130 in that it functions as an access point to a network (e.g., network 180) and is in proximity to end users and end devices such as client devices. Thus, the edge device may also include information describing context or activity in the proximity of the edge device such as radio conditions, weather information, local traffic, precise device location, or confidential information that cannot be shared with higher levels in a hierarchical architecture. An edge device may also include an access interface to enable the edge device to function as an access point to the network 180. The access interface may enables a wired or wireless connection to a client device using various protocols. The edge device may receive service components from an orchestrator 140 or other computing devices 130 via the network 180 for deployment and execution.

The OSS 150 and network manager 160 include one or more systems that manage the various components of the system 100 over the network 180. The OSS 150 and network manager 160 may perform operational tasks from a legacy system that are typically human operated, or may include automated systems that implement artificial intelligence. For instance, the OSS 150 and network manager 160 may maintain inventory of and configure computing devices 130, orchestrators 140, and external systems 170 connected over the network 180. Additionally, the OSS 150 and network manager 160 may perform load balancing or fault management for information services.

External systems 170 may include any number of systems outside a domain of the computing devices 130 that receive information services. Additionally, external systems 170 may provide resources for information services such as service components, intelligent entities, or chaining configurations. Furthermore, external systems 170 may provide data for processing by the intelligent entities. Such information provided by external systems 170 may include, among others, manual user inputs, customer information, weather, and financial information.

The network 180 includes any combination of local area networks (LAN), wide area networks (WAN), wired or wireless networks, private networks, or virtual private networks, among other types of networks. The network 180 may communicate data in a control plane as well as a user plane. Data transmitted over the control plane include signal traffic such as control packets between routers in the network 180. Data transmitted over the user plane (also known as the data plane, forwarding plane, carrier plane, or bearer plane) include user traffic through routers to computing devices 130 of the network 180 such as client devices. In one embodiment, the orchestrators 140 receive resource tracking information from computing devices 130 via the control plane, and allocate user plane resources for service components to resources of the computing devices 130.

Example Intelligent Entities

Figure 2:
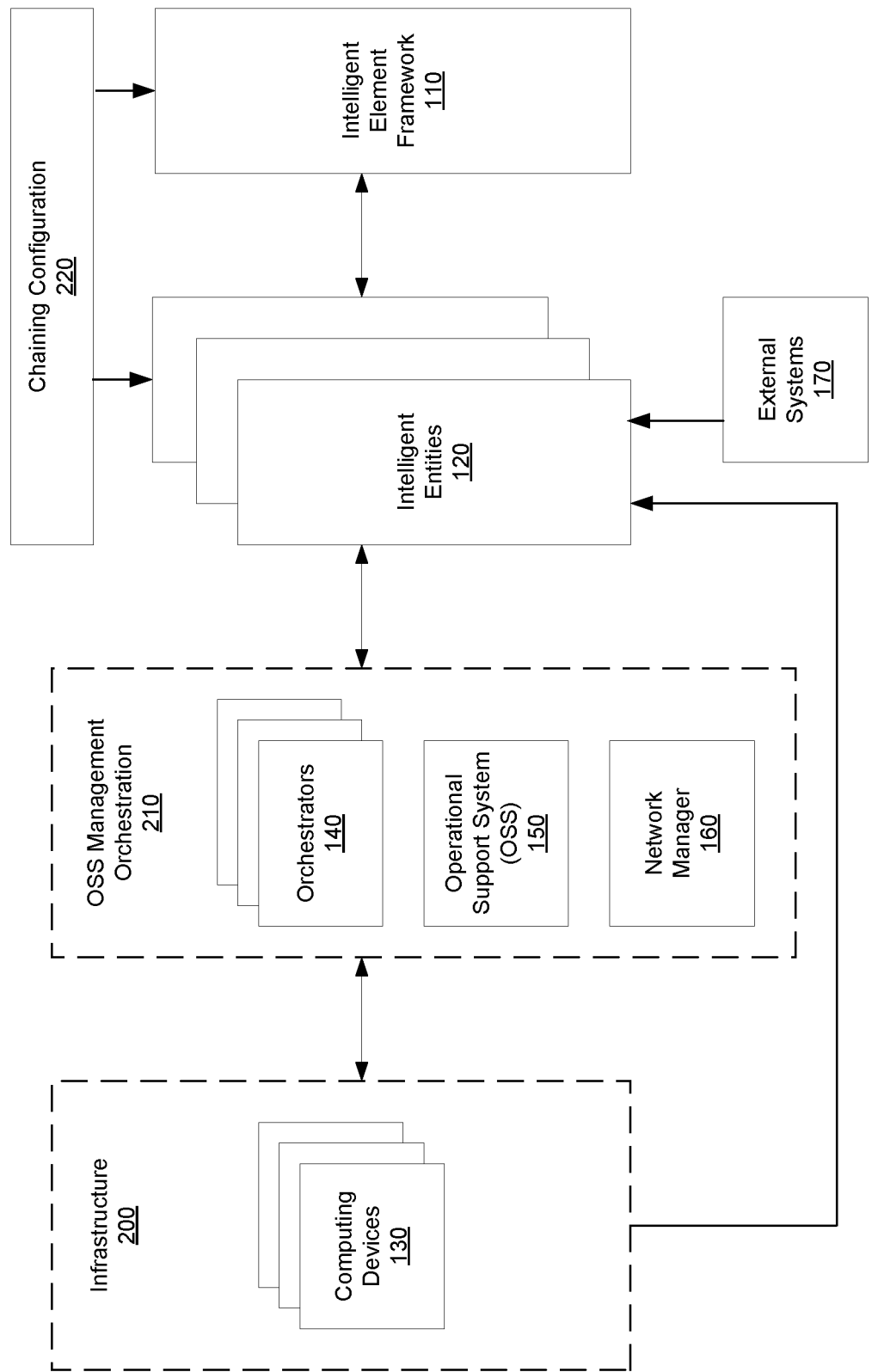
FIG. 2 is a diagram of a configuration of intelligent entities and an intelligent element framework, according to one embodiment.

FIG. 2 is a diagram of a configuration of intelligent entities 120 and an intelligent element framework 110, according to one embodiment. In the "backend" embodiment shown in FIG. 2, the intelligent element framework 110 is not visible to the components for OSS management and orchestration 210, e.g., the orchestrators 140, OSS 150, and network manager 160. The intelligent element framework 110 communicates with the intelligent entities 120 using the chaining configuration 220 to manage the infrastructure 200 of computing devices 130. The intelligent entities 120 may receive information from external systems 170 for use in executing tasks.

Figure 3:
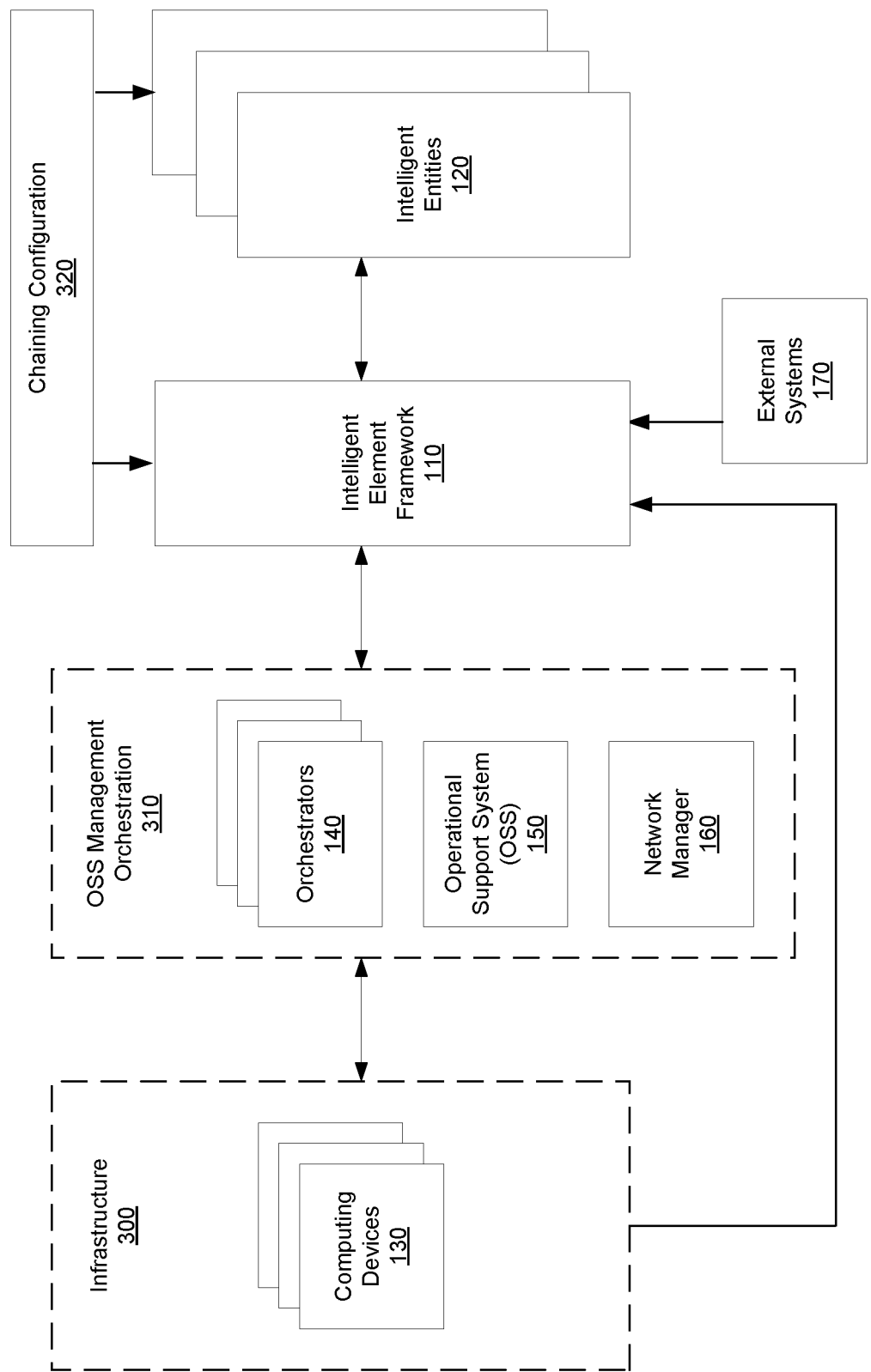
FIG. 3 is a diagram of another configuration of intelligent entities and an intelligent element framework, according to one embodiment.

FIG. 3 is a diagram of another configuration of intelligent entities and an intelligent element framework, according to one embodiment. In the "frontend" embodiment shown in FIG. 3, the intelligent element framework 110 communicates with the OSS management and orchestration 310 using the chaining configuration 320. Moreover, the intelligent entities 120 communicate with the OSS management and orchestration 310 indirectly through the intelligent element framework 110, e.g., to manage the infrastructure 300 of computing devices 130.

Figure 4:
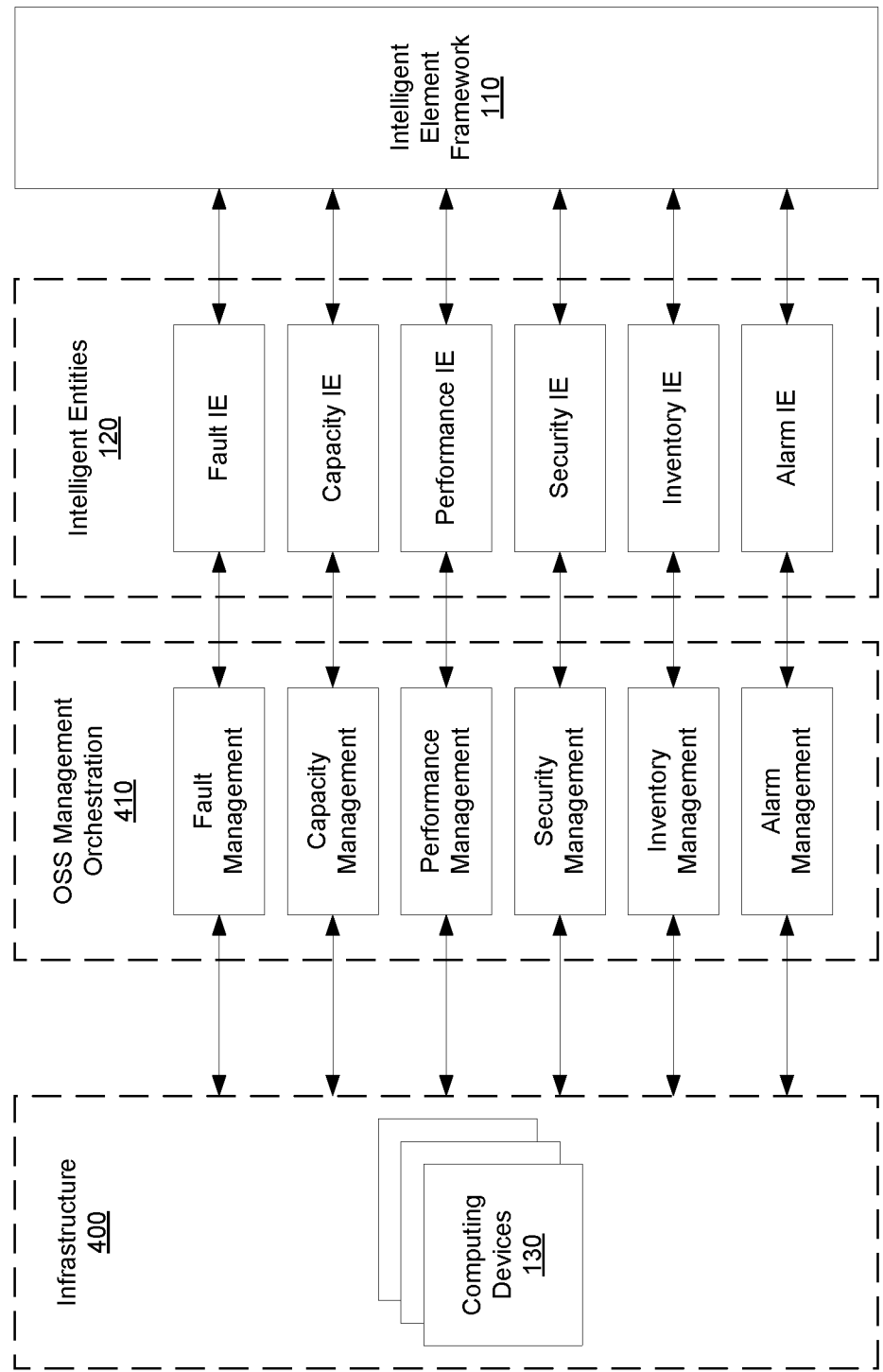
FIG. 4 is a diagram of various types of intelligent entities according to one embodiment.

FIG. 4 is a diagram of various types of intelligent entities 120 according to one embodiment. Example types of intelligent entities 120 include a Fault IE, Capacity IE, Performance IE, Security IE, Inventory IE, and Alarm IE. The intelligent entities 120 may communicate with various management components (e.g., fault management, capacity management, etc.) of the OSS management and orchestration 410 to perform different types of tasks. Particularly, the Fault IE may identify and determine solutions to issues for fault management. The Capacity IE may track workload or resources of computing devices 130 and predict when additional capacity should be allocated to support an increase in demand. The Performance IE may monitor performance metrics of computing devices 130 such as latency, memory usage, CPU usage, network bandwidth, etc. The Security IE protects the infrastructure 400 from unauthorized activity and may detect anomalies in the system. The Inventory IE manages inventory of the computing devices 130 or other components in the system. The Alarm IE generates and transmits alarms responsive to determining that a given event has occurred (e.g., commissioning or decommissioning of a computing device 130) or that a certain condition has been satisfied (e.g., resource usage has reached at least a threshold level of capacity).

Figure 5A:
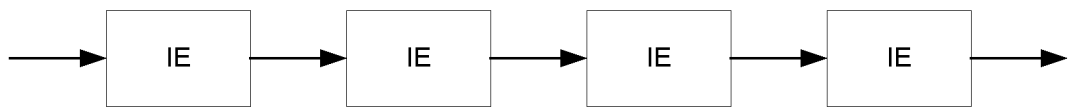
FIGS. 5A, 5B, 5C, 5D, and 5E illustrate directed graphs of intelligent entities, according to various embodiments.
Figure 5B:
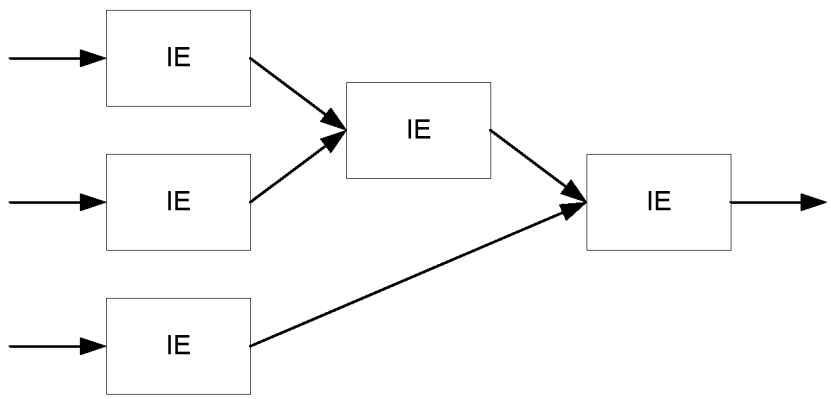
Figure 5C:
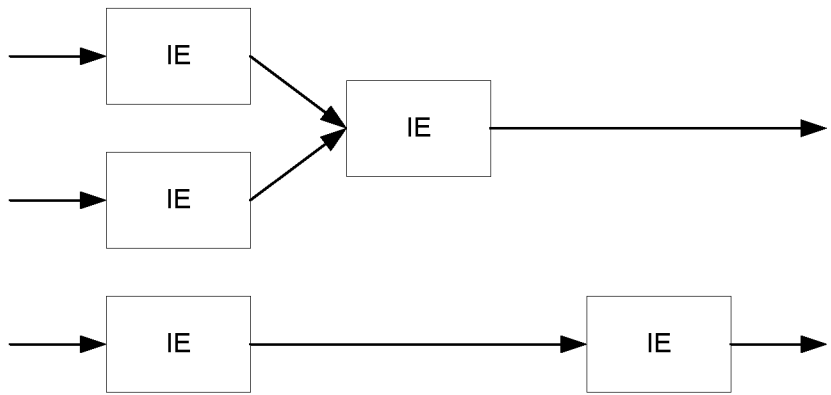

FIGS. 5A. 5B, 5C, 5D, and 5E illustrate directed graphs of intelligent entities according to various embodiments. As previously described, the intelligent element framework 110 may chain intelligent entities 120 together, and examples of such chaining are illustrated in FIGS. 5A-E. The intelligent element framework 110 may configure intelligent entities 120 according to a chaining configuration describing the chaining structure and organization of IEs. The chaining configuration may use language for describing graphs, e.g., in JSON, YAML, or another suitable data format. In the embodiment shown in FIG. 5A, four IEs are chained in series, where an IE provides output to a subsequent IE in the directed graph. In the embodiment shown in FIG. 5B, some of the IEs receive output from two or more other IEs in the directed graph, e.g., directly or indirectly. In the embodiment shown in FIG. 5C, the directed graph includes two sub-graphs that do not necessarily need to be connected to each other (e.g., in a forest graph including multiple trees). For instance, the IEs of the sub-graphs (e.g., trees) are configured to perform different tasks that may be independent from each other.

Figure 5D:
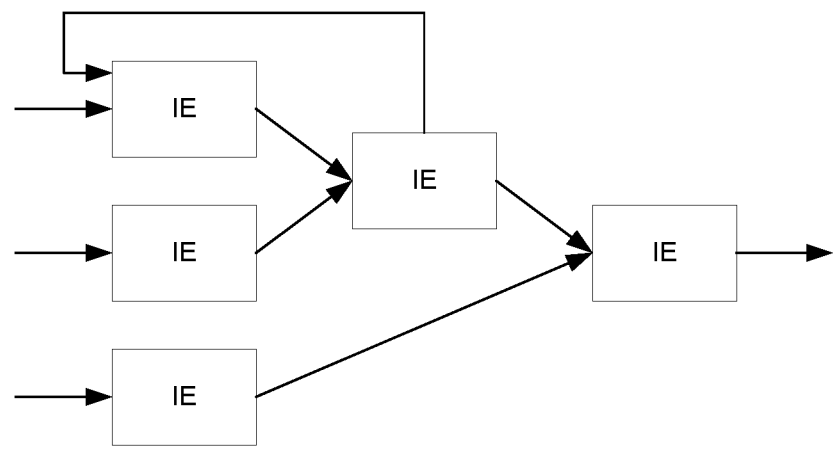
Figure 5E:
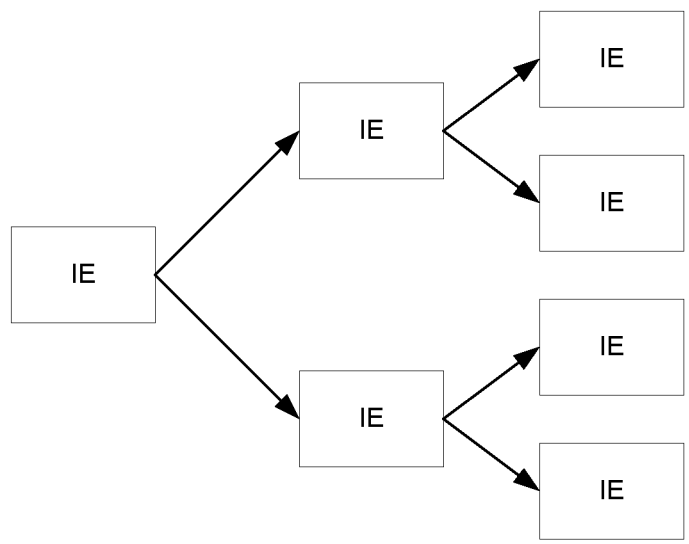

In the embodiment shown in FIG. 5D, the directed graph includes an IE that receives, as feedback, output from another IE downstream in the directed graph. In other embodiments, an IE may receive feedback from any number of other IEs (e.g., in a cyclic graph). In the embodiment shown in FIG. 5E, the directed graph includes IEs that provide output to two other IEs. The embodiment of FIG. 5E represents a binary tree data structure, though in other embodiments, IEs may provide output to any number (e.g., greater than two) of other IEs.

In other embodiments, instead of using directed graphs to define architecture of sending or receiving data to or from the intelligent entities 120, a publish-subscribe mechanism may be employed to share the information across thee intelligent entities 120.

Figure 6:
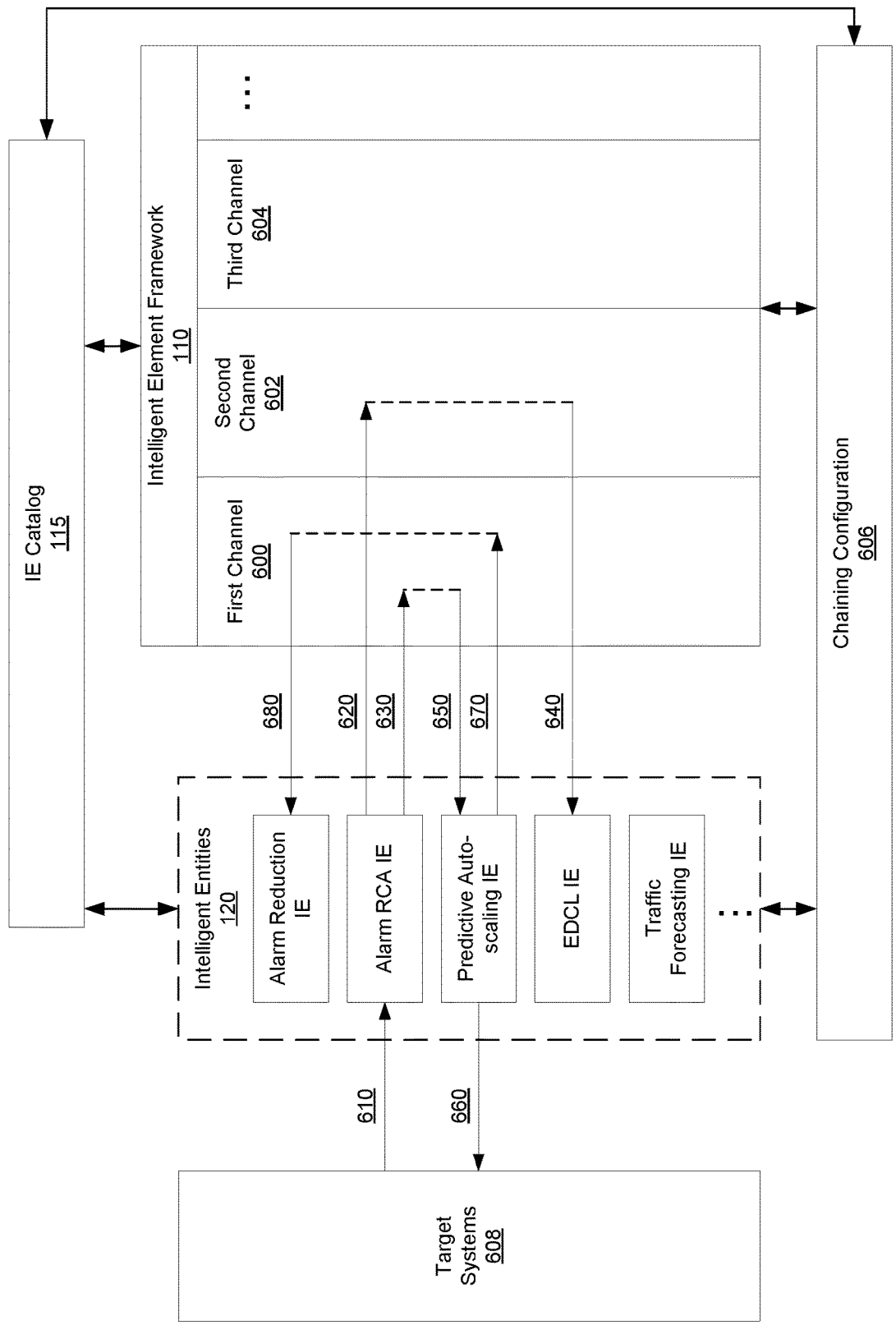
FIG. 6 is a diagram of data flow between intelligent entities and an intelligent element framework, according to one embodiment.

FIG. 6 is a diagram of data flow between intelligent entities 120 and an intelligent element framework 110, according to one embodiment. Alarm root cause analysis (RCA) IE receives data 610 from the target systems 608 and determines the cause of an alarm is triggered in the target systems 608 based on data 610. For instance, the Alarm RCA IE identifies an outage on a network component that caused the triggering of the alarm. The Alarm RCA IE publishes parameters 620 and 630 of the alarm or corresponding incident to certain configured channels of the intelligent element framework 110. For example, parameters 630 are published to the first channel 600, which may be a resource management channel configured to receive information describing status of network components. Additionally, parameters 620 are published to the second channel 602, which may be an access network channel, and the third channel 604 may be a communication channel. The second channel 602 transmits information 640 associated with the alarm to cloud dynamic location (CDL) IE responsive to receiving the parameters from the Alarm RCA IE. The CDL IE may recommend or execute deployments or changing of locations of service components in one or more computing devices 130 based on various factors such as latency, hierarchy, capacity and availability of the computing devices 130.

The first channel 600 transmits information 650 associated with the alarm to the Predictive Auto-scaling IE responsive to receiving the parameters from the Alarm RCA IE. The Predictive Auto-scaling IE may determine a reallocation of resources to account for the identified outage on the network component. In some embodiments, the Predictive Auto-scaling IE may use a machine learning model to predict an impact on resource utilization as result of the outage. Based on the prediction, the Predictive Auto-scaling IE can determine an appropriate action or no action. For instance, responsive to determining a negative impact or reduction in available resources, the Predictive Auto-scaling IE determines to commission additional resources or turn off existing virtual machines or computing devices 130 to release lower priority or unused resources. In some embodiments, the Predictive Auto-scaling IE may check with another IE before performing an action. For example, the Predictive Auto-scaling IE checks with a Social Media IE to determine whether resource capacity should be maintained for an upcoming social event.

The Predictive Auto-scaling IE communicates instructions 660 the target systems 608 to execute the reallocation of resources. In an embodiment, the Predictive Auto-scaling IE uses a virtual infrastructure manager (VIM) to execute the reallocation or other actions. The Predictive Auto-scaling IE publishes information 670 describing the reallocation to the first channel 600. The first channel 600 transmits the information 680 to the Alarm Reduction IE to capture parameters of the outage incident and resolution. The Alarm Reduction IE may reduce or remove the alarm previously identified by the Alarm RCA IE, e.g., responsive to determining that the incident has been properly resolved or mitigated.

In the example use case of FIG. 6, the intelligent element framework 110 may configure the channels using the chaining configuration 606 or the IE catalog 115. Moreover, the intelligent element framework 110 may provision tasks to the different intelligent entities 120 according to the chaining configuration 606 or the IE catalog 115. The IE catalog 115 may define the topology or connections between the different intelligent entities 120. As described above, the Alarm RCA IE, Predictive Auto-scaling IE, and Alarm Reduction IE perform different tasks in response to the outage on the network component. Thus, the intelligent element framework 110 can streamline responses to various types of events by distributing tasks to customized intelligent entities 120 and transmit information between intelligent entities 120 via specific types of channels.

Example Computing Device

Figure 7:
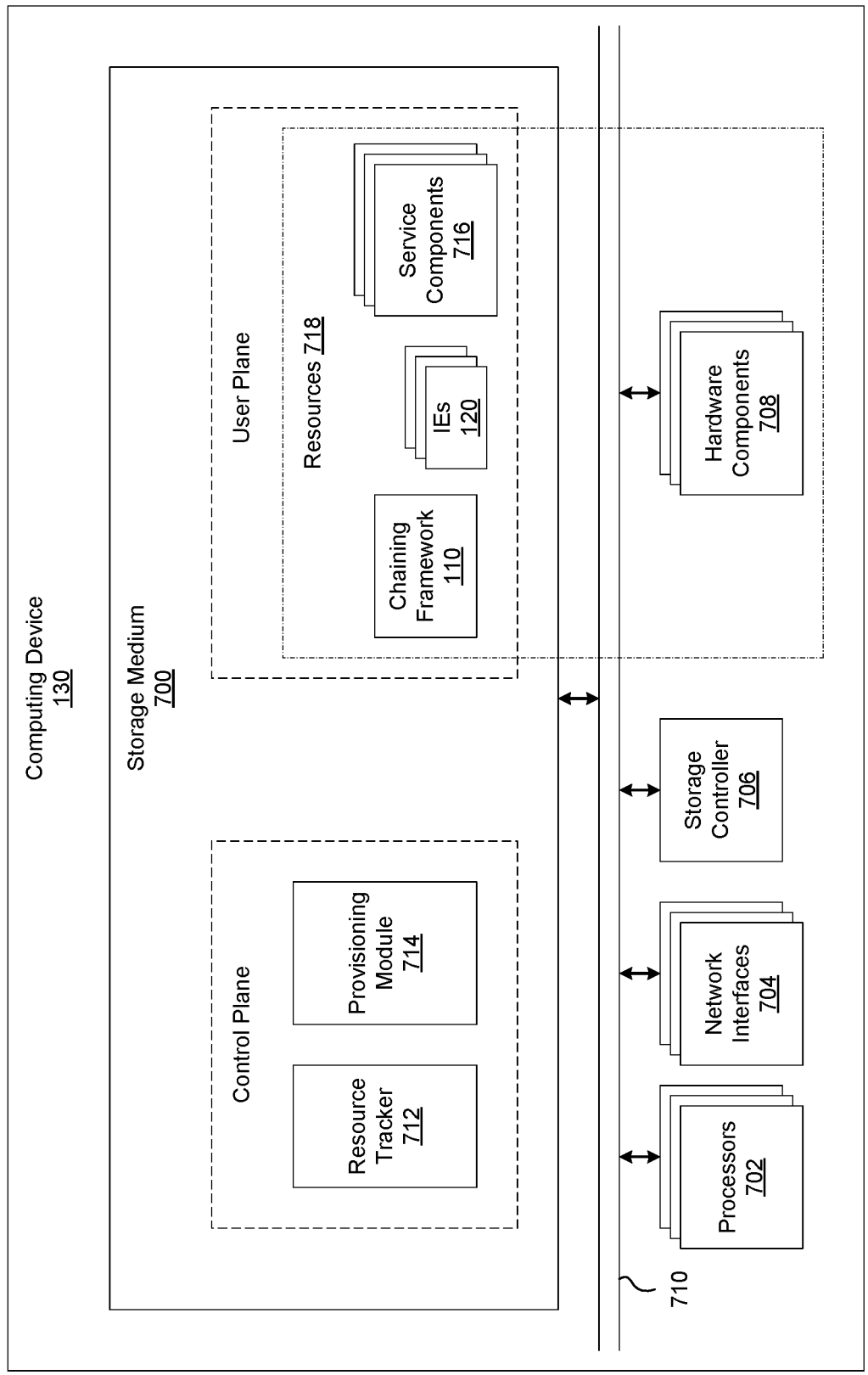
FIG. 7 is a block diagram of a computing device, according to one embodiment.

FIG. 7 is a block diagram of a computing device 130, according to one embodiment. The computing device 130 includes, among others, a storage medium 700, one or more processors 702, one or more network interfaces 704, a storage controller 706, one or more hardware components 708, and a bus 710 connecting these components. Hardware components 708 may include, for example, sensors, antennas, GPUs, display devices, I/O interfaces, etc. The one or more processors 702 execute instructions stored in the storage medium 700. The one or more network interfaces 704 are configured to communicatively connect the computing device 130 over the network 180 to external systems 170, computing devices 130, orchestrators 140, or other components.

The storage controller 706 manages the operation of the storage medium 700. The storage controller 706 may read data from the storage medium 700 for processing by the one or more processors 702. The storage controller 706 may also write data to the storage medium 700 received from various subcomponents of the computing device 130 or from external systems 170 or other components.

The storage medium 700 is a non-transitory computer-readable storage medium storing, among others, a resource tracker 712, provisioning module 714, and resources 718. The storage medium 700 may also include software components not illustrated in FIG. 7 such as an operation system (OS). In some embodiments, the storage medium 700 is implemented as random-access memory (RAM) or other types of memory hardware.

Software components of the resources 718 operate on the user plane of the network 180 may include the intelligent element framework 110 (e.g., on a server type computing device 130 or another suitable central location), IEs 120 (e.g., on edge devices and other types computing devices 130), and any number of allocated service components 716, e.g., allocated on a hierarchical level of the computing device 130. In some embodiments, the IEs 120 may be distributed over multiple computing devices 130 that are communicatively coupled together via the intelligent element framework 110. Accordingly, each of the IEs 120 may be logically encapsulated yet also physically separate.

The resources 718 may include any combination of hardware or software resources. Example service components 716 include a national content catalog for a content distribution network service, a global messaging hub for a messaging service, a global user list for an operation management service, or a component that prepares and generates consolidated reports on alarms. The resources 718 may also store parameters used by a service component 716. The parameters may include, among others, virtualization parameters to configure a virtual machine instantiated on the computing device, a global content list, a global content repository, or consolidated sensor metrics. In some embodiments, the hardware components 708 may also embody one or more of the service components 716.

The resource tracker 712 and provisioning module 714 operate on the control plane of the network 180. The resource tracker 712 monitors the resources 718 of the computing device 130. The resource tracker 712 may track, for example, current and historical demand for the resources 718, assignments of service components to the resources 718, performance requirements of service components, or characteristics of the resources 718. Types of the characteristics may include compute characteristics (e.g., CPU type, number of CPUs, CPU speed or latency, etc.), storage characteristics (e.g., volatile or non-volatile memory, storage volume in gigabytes or terabytes, read and write latency, etc.), networking characteristics (e.g., number of interfaces and network speed), node geographical location (e.g., jurisdiction, country, or longitude and latitude coordinates of the computing devices), node connectivity (e.g., nearby computing devices, connection speed, etc.), and access connectivity (e.g., fiber connection, radiofrequency access, spectrum, bandwidth, cell identification, etc.), among other characteristics. The resource tracker 712 may provide the tracked resource information to an orchestrator 140 or the provisioning module 714.

The provisioning module 714 provisions and deploys service components of information services as resources in the computing device 130 according to resource information received from the resource tracker 712 or instructions received from an orchestrator 140. In particular, the provisioning module 714 may provide provisioning information to instantiate a service component in the computing device 130. In some embodiments, the provisioning module 714 may also provision and deploy service components as resources in other computing devices 130 communicating with the computing device 130. In embodiments including computing devices 130 that are hierarchically structured, the provisioning module 714 may store information used by a provisioning module of another computing device 130 in a different level of the hierarchy. As an example, the provisioning module 714 may provision and deploy service components of a virtual machine onto a telecommunication server or edge device, e.g., to load-balance the payload of a cloud server.

Example Process Flows

Figure 8:
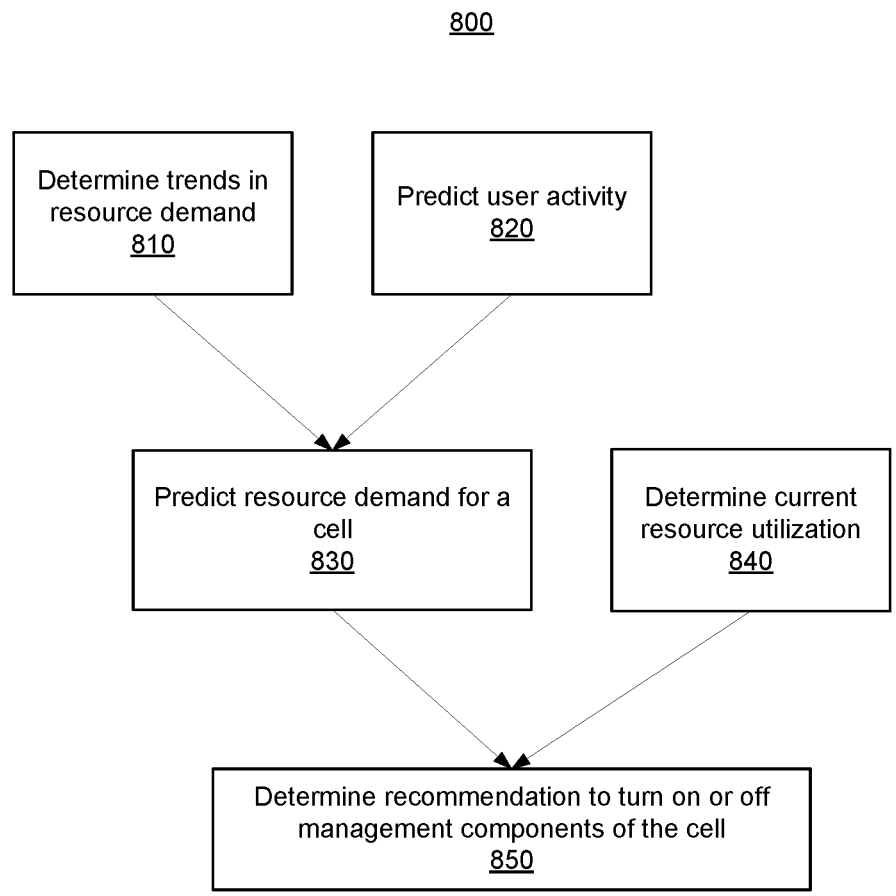
FIG. 8 is a flow chart illustrating a process for performing predictions using intelligent entities, according to one embodiment.

FIG. 8 is a flow chart illustrating a process 800 for performing predictions using intelligent entities, according to one embodiment. In an example use case, an intelligent element framework 110 chains a Traffic IE, User Activity IE, Resource Prediction IE, and Recommendation IE to perform energy management. The Traffic IE determines trends 810 in resource demand. The Traffic IE may use a model trained using one or more features to determine trends. For instance, the features indicate metrics associated with available resources or previous resource demand, e.g., a growth or decrease in demand using historical traffic data. Accordingly, the Traffic IE may learn to predict that similar or different trends may occur in the future given certain conditions. In some embodiments, the features are generated by at least one other intelligent entity 120.

The User Activity IE predicts user activity 820, e.g., using social media information or historical user movement. The User Activity IE may also use a model trained using one or more features to generate predictions of user activity. The model used by the User Activity IE may be different than a model used by the Traffic IE. Generally, intelligent entities 120 may use different models from each other, models trained with different training data, or models trained using different machine learning algorithms. The User Activity IE may predict user activity such as usage levels of computing devices 130, periods of time with relatively greater or less traffic on a network, locations to which users are likely to travel, or aggregate activity from a population of users.

The Traffic IE and User Activity IE may provide their outputs, resource trends and user activity predictions, respectively, to the Resource Prediction IE. In particular, the outputs may be provided via the intelligent element framework 110 that chains the Traffic IE and User Activity IE to the Resource Prediction IE, e.g., using one or more channels. The Resource Prediction IE predicts resource demand 830 for a cell (e.g., a computing device 130) using the input from the other IEs. The Resource Prediction IE may also receive other types of input such as weather information, news, or events for generating predictions regarding the cell. In addition, the Resource Prediction IE determines current resource utilization 840. The Resource Prediction IE provides its outputs to the Recommendation IE.

The Recommendation IE determines a recommendation 850 to turn on or off management components of the cell. For example, responsive to a prediction that resource demand and user activity is predicted to decrease during a given time period (e.g., the weekend), the Recommendation IE recommends to turn off at least a portion of the cell to preserve energy. In some embodiments, the Recommendation IE may determine other types of recommendations, for example, requesting an intervention to mitigate an identified fault or alert, commissioning new management components or reconfiguring existing management components, or triggering other artificial intelligence tasks.

The process 800 as described above is performed using intelligent entities 120 chained in series as part of a directed graph. In other embodiments, the intelligent entities 120 may be part of a cyclic graph where at least one of the IEs uses feedback from another IE. For instance, the Resource Prediction IE predicts resource demand using previous recommendations determined by the Recommendation IE. The intelligent element framework 110 or an IE may determine a quality of output generated by another IE for the feedback.

FIG. 9 is a flow chart illustrating a process 900 for providing information service using intelligent entities 120, according to one embodiment. The intelligent element framework 110 deploys management components 910 (e.g., service components) in an information service infrastructure to perform a task of the information service. Each management component is associated with an intelligent entity 120 configured to perform, using a machine learning algorithm, prediction or inference associated with a portion of the task handled by the management component.

A first intelligent entity 120 performs prediction or inference 920 to generate a first output. The first intelligent entity 120 may use a trained model to predict resource demand, user activity, or resource utilization, among other types of metrics or events. The first intelligent entity 120 may also infer trends or macro-level information from data or features used to train the model.

A second intelligent entity 120 receives the first output 930 from the first intelligent entity 120 via an intelligent element framework 110. In particular, the first output may be routed between the first and second intelligent entities 120 through a given channel configured by the intelligent element framework 110. Further, the intelligent element framework 110 may determine a channel from a set of multiple types of channels (e.g., channels 600-604 shown in FIG. 6) for routing outputs between intelligent entities 120. The intelligent element framework 110 may use multiple channels to reduce noise and focus on specific purposes or types of tasks to be executed by the intelligent entities 120. Moreover, intelligent entities 120 may use discretion to subscribe to specific channels of interest instead of receiving communication published on all channels.

The second intelligent entity 120 performs prediction or inference 940 to generate a second output based at least on the first output. The second intelligent entity 120 may use the first output as training data for a model, e.g., different than the model used by the first intelligent entity 120. The models may differ because the first and second intelligent entities 120 are trained for different purposes or to perform different types of predictions or inferences.

The intelligent element framework 110 sends the second output 950 to one or more target systems to provide the information service. As one use case, for a social networking information service, the target systems may use the second output to customize content, user interfaces, or user experiences in a social network. In a different example, for an AR or VR information service, the target systems may use the second output for rendering image or video graphics for display to a user in an AR or VR environment. Furthermore, for a navigation or autonomous vehicle information service, the target systems may use the second output for determining routing directions or detecting and avoiding objects on the road.

The steps of the process as described in FIG. 9 are merely illustrative. For example, the intelligent element framework 110 may deploy management components to additional intelligent entities 120 and repeat the steps 920-940 any number of times to generate outputs based on prediction or inferences by the additional intelligent entities 120. In an embodiment, a third intelligent entity 120 performs prediction or inference to generate a third output simultaneously with generation of the first output or the second output. The intelligent element framework 110 may send the third output to the target systems to provide the information service.

In an embodiment, the intelligent element framework 110 may send a response to the first output from the second intelligent entity 120 to the first intelligent entity 120. The second intelligent entity 120 may determine the response according to the second output, e.g., the response is a resolution to an alarm indicated by the first output.

In various embodiments, the intelligent element framework 110 may transmit outputs or other data elements using a subscriber and publisher configuration. For instance, the intelligent element framework 110 may receive a request for the first output from the second intelligent entity 120. The intelligent element framework 110 subscribes the second intelligent entity 120 to receive publication of information from the first intelligent entity 120. Responsive to receiving the request (e.g., for subscription), the intelligent element framework 110 sends the first output from the first intelligent entity 120 to the second intelligent entity 120.

What is claimed is:

1. A method for providing an information service, comprising:
    deploying a plurality of service components in an information service infrastructure to perform a task of the information service, each of the service components representing a discrete functional software or hardware component that performs a portion of the task;
    instantiating a first intelligent entity of a plurality of intelligent entities on a cloud server and the information service infrastructure including at least one edge device connected to the cloud server over a network;
    instantiating a second intelligent entity of the plurality of intelligent entities on the cloud server and the information service infrastructure;
    registering, in a catalog of an intelligent element framework instantiated using one or more computing devices or networking devices, instantiation of the first intelligent entity and the second intelligent entity;
    identifying, from the catalog, at least one of the service components to provide input to the first intelligent entity, the input representing metrics associated with trends in resource demands by the service components in the information service infrastructure;
    performing prediction or inference to generate a first output by first intelligent entity by processing the input identified from the catalog, the first output indicating future demand of resources in the information service infrastructure for the plurality of service components;
    sending, via a first channel of the intelligent element framework, the first output to the second intelligent entity according to a chaining configuration of the plurality of intelligent entities;
    performing, by the second intelligent entity, prediction or inference to generate a second output on reallocation of the resources of the information service infrastructure to the service components, by processing at least on the first output; and
    sending the second output to a virtual infrastructure manager to cause the information service infrastructure to reallocate the resources to the service components.

2. The method of claim 1, wherein each of the intelligent entities are trained to perform the prediction or inference for different portions of the task.

3. The method of claim 1, wherein the chaining configuration is defined by a directed graph of the intelligent element framework, the directed graph including at least a first node corresponding to the first intelligent entity and a second node corresponding to the second intelligent entity.

4. The method of claim 3, wherein the directed graph has a tree structure or a cyclic structure.

5. The method of claim 1, further comprising:
    instantiating a third intelligent entity of the plurality of intelligent entities on the cloud server and the information service infrastructure;

performing, by the third intelligent entity, prediction or inference to generate a third output simultaneously with generation of the first output or the second output; and sending the third output to the second intelligent entity according to the chaining configuration.

6. The method of claim 1, further comprising:
sending the first output from the first intelligent entity to more than one of the intelligent entities via the intelligent element framework.

7. The method of claim 1, further comprising:
sending a response to the first output from the second intelligent entity to the first intelligent entity via the intelligent element framework, the response determined according to the second output.

8. The method of claim 1, further comprising:
receiving, from the second intelligent entity, a request for the first output; and
sending the first output from the first intelligent entity to the second intelligent entity via the intelligent element framework at least responsive to receiving the request.

9. The method of claim 1, further comprising:
sending feedback to the first intelligent entity and the second intelligent entity responsive to determining a quality of the first output and the second output, respectively, the feedback indicating a positive or negative impact.

10. The method of claim 1, wherein the information service infrastructure includes a plurality of computing devices that are structured in a hierarchy.

11. The method of claim 1, wherein the intelligent element framework does not communicate directly with the plurality of service components.

12. The method of claim 1, wherein generating the first output includes detecting a change in activity of the plurality of service components.

13. The method of claim 12, wherein the change in activity is an increase in demand for resources, and wherein the reallocation of resources includes decommissioning one or more of the plurality of service components.

14. The method of claim 1, further comprising:
determining the channel using the catalog.

15. The method of claim 1, wherein the first intelligent entity or the second intelligent entity performs the prediction or inference using a reinforcement learning mechanism.

16. The method of claim 1, further comprising:
registering a third intelligent entity instantiated in the catalog of the intelligent element framework; and
responsive to the instantiation of the third intelligent entity, sending information describing the third intelligent entity from the catalog to at least one of the first intelligent entity and the second intelligent entity.

17. A non-transitory computer-readable storage medium storing instructions for providing an information service, the instructions when executed by a processor causing the processor to:
deploy a plurality of service components in an information service infrastructure to perform a task of the information service, each of the service components representing a discrete functional software or hardware component that performs a portion of the task;
instantiate a first intelligent entity of a plurality of intelligent entities on a cloud server and the information service infrastructure including at least one edge device connected to the cloud server over a network;
instantiate a second intelligent entity of the plurality of intelligent entities on the cloud server and the information service infrastructure;
register, in a catalog of an intelligent element framework instantiated using one or more computing devices or networking devices, instantiation of the first intelligent entity and the second intelligent entity;
identify, from the catalog, at least one of the service components to provide input to the first intelligent entity, the input representing metrics associated with trends in resource demands by the service components in the information service infrastructure;
perform prediction or inference to generate a first output by first intelligent entity by processing the input identified from the catalog, the first output indicating future demand of resources in the information service infrastructure for the plurality of service components;
send, via a first channel of the intelligent element framework, the first output to the second intelligent entity according to a chaining configuration of the plurality of intelligent entities;
perform, by the second intelligent entity, prediction or inference to generate a second output on reallocation of the resources of the information service infrastructure to the service components, by processing at least on the first output; and
send the second output to a virtual infrastructure manager to cause the information service infrastructure to reallocate the resources to the service components.

18. A system for providing information service, the system comprising:
a framework computing device configured to:
deploy a plurality of service components in an information service infrastructure to perform a task of the information service, each of the service components representing a discrete functional software or hardware component that performs a portion of the task, and
store a catalog of intelligent entities, configuration of channels for communicating with the intelligent entities and inputs for the intelligent entities;
a first computing device instantiating a first intelligent entity configured to perform prediction or inference to generate a first output by processing an input from at least one of the service components as defined in the catalog, the input representing metrics associated with trends in resource demands by the service components in the information service infrastructure, the first output indicating future demand of resources in the information service infrastructure for the plurality of service components;
a second computing device instantiating a second intelligent entity configured to:
receive the first output according to a chaining configuration of the plurality of intelligent entities;
perform, by the second intelligent entity, prediction or inference to generate a second output on reallocation of the resources of the information service infrastructure to the service components, by processing the first output; and
send the second output to a virtual infrastructure manager to cause the information service infrastructure to reallocate the resources to the service components.

19. A method for providing an information service, comprising:
deploying a plurality of service components in an information service infrastructure to perform a task of the information service, each of the service components representing a discrete functional software or hardware component that performs a portion of the task;

instantiating a first intelligent entity of a plurality of intelligent entities on a cloud server and the information service infrastructure including at least one edge device connected to the cloud server over a network;

instantiating a second intelligent entity of the plurality of intelligent entities on the cloud server and the information service infrastructure;

performing prediction or inference to generate a first output by the first intelligent entity by processing an input from at least one of the service components, the input representing metrics associated with trends in resource demands by the service components in the information service infrastructure, the first output indicating future demand of resources in the information service infrastructure for the plurality of service components;

determining a channel of a plurality of channels of the intelligent element framework through which the received first output is to be routed from the first intelligent entity to the second intelligent entity;

sending, via an intelligent element framework, the first output to the second intelligent entity of the plurality of intelligent entities via the channel according to a chaining configuration of the plurality of intelligent entities;

performing, by the second intelligent entity, prediction or inference to generate a second output on reallocation of the resources of the information service infrastructure to the service components, by processing at least on the first output; and sending the second output to a virtual infrastructure manager to cause the information service infrastructure to reallocate the resources to the service components.

20. The method of claim 1, wherein the second intelligent entity generates the second output responsive to detecting outage of a portion of the resources in the information service infrastructure.

\* \* \* \* \*